United States Patent
Gallotti Guimarães

(10) Patent No.: US 6,256,589 B1
(45) Date of Patent: Jul. 3, 2001

(54) METHOD FOR THE MEASUREMENT OF MULTIDIRECTIONAL FAR-FIELD SOURCE SIGNATURES FROM SEISMIC SURVEYS

(75) Inventor: Marcos Antônio Gallotti Guimarães, Rio de Janeiro (BR)

(73) Assignee: Petroleo Brasileiro S.A.-Petrobras, Rio de Janeiro (BR)

( * ) Notice: Subject to any disclaimer, the term of this patent is extended or adjusted under 35 U.S.C. 154(b) by 0 days.

(21) Appl. No.: 09/453,530

(22) Filed: Dec. 3, 1999

(51) Int. Cl.⁷ .................................................. G01V 1/28
(52) U.S. Cl. ................................. 702/18; 367/20
(58) Field of Search ................. 702/14, 16, 17, 702/18; 367/15, 20

(56) References Cited

U.S. PATENT DOCUMENTS

| | | |
|---|---|---|
| 4,476,550 | 10/1984 | Ziolkowski et al. . |
| 4,658,384 | 4/1987 | Dragoset et al. . |
| 4,694,435 | 9/1987 | Magneville . |
| 4,872,144 * | 10/1989 | Young et al. .................. 367/20 |
| 4,970,697 | 11/1990 | Earley et al. . |
| 5,029,145 | 7/1991 | Marades et al. . |
| 5,113,377 * | 5/1992 | Johnson ........................ 367/15 |
| 5,257,241 * | 10/1993 | Henderson et al. ............ 367/15 |

OTHER PUBLICATIONS

R.C. Johnson et al.—Special Report of the SEG Technical Standards Committee—SEG Standards, Geophysics vol. 53, No. 4, pp. 566–575 Apr. 1988.

P.M. Krail—Deconvolution of a directional marine source—Geophysics vol. 55, No. 12, pp. 1542–1548, Dec. 1990.

G.E. Parkes et al.—The signature of an air gun array—Computation from near–field measurements including interactions—Practical considerations—Geophysics vol. 48, No. 2, pp. 105–111 Feb. 1989.

A. Ziolkowski et al.—The signature of an air gun array: Computation from near–field measurements including interactions—Geophysics vol. 47, No. 10, pp. 1413–1421 Oct. 1982.

Gallotti Guimaraes, et al.—Processing of Three Dimension Vertical Cable data over SEG/EAGE Physical Model—OTC Paper 8820, May 1998.

W. Dragoset—A comprehensive method for evaluating the design of air guns and gun arrays—Geophysics—The Leading Edge of Exploration, Oct. 1984, pp. 52–60.

G.A. Roberts et al.—Directional Deconvolution of marine Seismic Reflection Data:North Sea Example—Geophysical Prospecting, vol. 38, pp. 881–888 Apr. 1990.

* cited by examiner

Primary Examiner—Donald E. McElheny, Jr.
(74) Attorney, Agent, or Firm—Sughrue, Mion, Zinn, Macpeak & Seas, PLLC

(57) ABSTRACT

A method is described for the measurement of multidirectional far-field source signatures from seismic surveys whereby a vertical cable acquisition technique is provided, vertical cable data are acquired, the proper receivers are specified to measure the signature, data are sorted into common selected receiver gathers CSRG, the direct wave within common receiver gather is properly windowed, the angles of each direct path are computed and the amplitude of the signatures is normalized, so as to obtain the multidirectional far-field signatures of the seismic source array having the same characteristics as those that generated the seismic reflections.

18 Claims, 5 Drawing Sheets

FLOW CHART

METHOD FOR THE MEASUREMENT OF MULTIDIRECTIONAL FAR-FIELD SOURCE SIGNATURES FROM SEISMIC SURVEYS

FIELD OF THE INVENTION

The present invention relates to a method for the measurement of the multidirectional far-field signatures of the explosive marine sources of seismic data acquisition for oil exploration, more specifically, to a method where the measurement of the multidirectional far-field signatures is obtained with the aid of the vertical cable technique. As a result, the final seismic image presents a higher resolution.

BACKGROUND INFORMATION

Basically, seismic source signatures are a representation of the acoustic pressure as a function of time. It is characterized as a wavelet that propagates with its free-surface ghost and whose amplitude is inversely proportional to its distance from the source.

Interest in air-gun signatures has included proposals for better measurement methods, empirical investigations of the relationship between signature characteristics and gun parameters, methods for improving synthetic calculations, as well as studies on the effect of the directional dependence of signatures on seismic data.

Moreover, some methods in the literature propose to deconvolve the source signature from marine seismic reflection data taking into account the directivity, for example, Krail, P. M. and Shin Y, in "Deconvolution of a directional marine source", Geophysics vol. 55, no. 12, p. 1542–1548 (1990) and Roberts, G. A and Goulty, N. R. in "Directional deconvolution of Marine Seismic Reflection Data: North Sea Example", Geophysical Prospecting, vol 38, p. 881–888 (1990).

For the calculation of deconvolution filters, those methods require the knowledge of the far-field source signatures radiated in all directions, known as "multidirectional far-field signatures".

The marine seismic sources for oil exploration are air-gun arrays. The arrays are composed of air-guns with different volumes placed at different positions in x- and y-directions but having approximately the same depth. The combination of air-guns with different volumes reduces the bubble effect generated by this type of source placed under water and also enhances the power of this type of source.

The signature of an air-gun array depends on many factors: the range of gun volumes, the array geometry, the gun-firing synchronization, the direction of observation relative to the array, and mainly on all the equipment involved in the acquisition of the signature.

The problem of obtaining the far-field signature is well understood. In the case of source arrays, a source-receiver separation constraint should be considered. A signal generated by the most distant source element in the array must arrive at any point receiver simultaneously with those signals generated by the closest source element of the center of the array.

Such separation is known as the far-field of an array. If the receiver is too close to the array, this requirement is not satisfied and distortion occurs depending on the dimension of the source array. At the far-field the waveform of the signature will vary, according to the position from which it is observed. This effect is called directivity or multidirectional effect, which causes the signature to vary according to the incident angle, and azimuth angles related to the free surface.

The multidirectional far-field signature of an array can not be monitored during conventional data acquisition. R. C. Johnston et al. in Special Report of the SEG technical Standards Committee, SEG standards for specifying marine seismic energy sources, Geophysics, vol. 53 no. 4, p. 566–575 (1988) describe a method using sonobuoys to acquire the signatures. Differences in the survey environment and the instruments used cause significant variation between the true signature and the acquired one.

Therefore a method has been suggested for computing air-gun signatures using near-field hydrophones, and then processing those data to extract the far-field signatures, as described by G. E. Parkes et al. in "The signature of an air-gun array: Computation from near-field measurements including interactions—Practical Considerations", Society of Exploration Geophysics (SEG), vol. 48, no. 2, p. 105–111 (1984). This method appears feasible in practice, but it does add more complexity to the deployment of an air-gun array.

There have also been suggested methods to model the far-field signature. In this case, the important parameters to know are: initial pressure, gun positions, gun volumes, gun firing times, and the open port area Vs time for each gun. Most of those parameters vary from shot to shot and their measurement is not easily obtained during a conventional operation. In this respect, see Dragoset, W. in "A comprehensive Method for Evaluating the Design of Air-guns and Air-gun Arrays". The leading Edge of Exploration, vol. 3, p. 52–61 (1984).

In short, directivity or multidirectional effect arises because of the dimension of the seismic source arrays. The arrays contain air-guns of different volumes to enhance the power of the source and to cancel the bubble effect caused by this type of source as well. It follows that the recorded wave field is the linear superposition of the responses from each source element. This means that spatial smearing should occur due to the finite dimensions of the source array. The smearing varies according to the angle of the wave arriving at the punctual observer, this leading to directivity.

The far-field signature can not be acquired simultaneously to the conventional data acquisition operation. The receivers inside the streamer are not in the far-field because they are behind the seismic vessel at depths varying from 10 to 12 m. The normal procedure is to carry out another survey to obtain a quantitative estimation of the signature, using sonobuoys.

U.S. Pat. No. 4,476,550 teaches a method for ascertaining the far field signature of an array of sound source units, each of which is small, compared with the wavelength of the highest frequency of interest. This is achieved by firing air-guns sequentially so that each generates all its significant radiation before the next is fired, and/or by firing more than one air-gun at a time, and separating them by at least one wavelength of the lowest frequency of interest. The far-field signature of each unit is measured by a pressure-sensitive detector close to the air-gun but in a region where the phase spectrum of the pressure field is independent of azimuth and range. The far-field signature of the array is derived from the measured signature by summation. This method employs the conventional streamer acquisition scheme.

Another experiment to obtain the far-field signature causes some problems of repeatability in some acquisition parameters. Such problems are related to differences in instruments and hydrophone responses, depths of the source, and sea conditions, which may happen when far-field signature and the data are acquired. Therefore a method has been suggested for computing air-guns signatures using near-field hydrophones, and then processing those data to extract far-field signatures, as taught by Ziolkowski, A et al. in "The Signature of an Air-gun array—Computation from near field measurements including interactions" —Geophysics vol. 47 (10), p. 1413–1421 (1982) as well as the above-cited article by G. E. Parkes.

U.S. Pat. No. 4,658,384 teaches a method for determining the far-field signature of an air-gun array by deriving from near-field measurements. An array of air-gun is deployed in the water at a desired depth. A receiver is suspended in the middle of the array at the same depth so that the guns are equidistant from the receiver. The lateral spacing between the guns and the sensor is much less than the water depth of the guns. Having fired the guns, the ghost reflection amplitude in the near field will be much less than the amplitude of the direct arrivals and can be ignored. The far-field is determined by inverting the observed pressure signature, delaying it in proportion to array depth and adding the inverted, delayed signature back to the original signature.

These methods appear feasible in practice, but they do add more complexity to the deployment of an air-gun array.

There have also been suggested methods to model the far-field signature. The important parameters to know are: initial pressure, gun positions, gun volumes, gun firing times, and the open port area vs. time for each gun. Most of those parameters vary from shot to shot and are not easily measured during the conventional operation. Moreover, the modeled signature lacks the recording instrument and other environment effects present in the seismic data.

The conventional seismic processing sequence uses spike deconvolution to remove the wavelet emitted by the source of the seismic data.

The spike deconvolution is based on the use of the Toeplitz method, which requires that the initial function be a minimum-phase, but this is not the case with the air-gun array signature function. The air-gun array signature is close to minimum-phase as a function of continuous time. This phase spectrum is different, however, from the minimum-phase spectrum that is estimated by spiking deconvolution for a sampled and time-windowed version of the signature. As a consequence, large phase errors may arise when spiking deconvolution is applied to an air-gun signature or to a recording instrument response. Therefore, deconvolution of the signature should be used to correct such phase errors. Signature deconvolution operators can be designed with the multidirectional signatures.

Thus, this method can become more reliable for seismic exploration and reservoir characterization especially in areas that need more vertical resolution.

Reservoir monitoring is another area that may be improved by using deterministic deconvolution with reliable source array signatures.

On board, as survey occurs, real time analysis of the measured signatures can provide to the acquisition a better quality control of the seismic source as well as of the navigation of the vertical cables.

A better way to acquire the multidirectional signature of the source at the time of the seismic data acquisition is, according to the method of the invention, to make use of the technology known as vertical cable.

Vertical cable is a technique used in several applications. For example, U.S. Pat. No. 4,694,435 teaches a vertical device for receiving acoustic waves in water which comprises a tubular element formed of several connected sections, buoyancy means close to a first end, ballasting means close to the second end, several receivers spaced apart inside certain sections of the tubular element and stabilizer fins fixed to the second end thereof. A cable connects the tubular elements to a towing vehicle.

U.S. Pat. No. 4,970,697 teaches a method of acquiring seismic data which includes a horizontal towed receiver array in conjunction with at least one vertically oriented receiver array formed from a plurality of receiver elements spaced apart vertically within a plurality of cable. By simultaneously recording the data from both arrays, seismic data can be acquired for locations directly beneath a fixed obstruction, which a towing vessel has had to steer around. This method is not directed to the measurement of the far-field signature.

Also, U.S. Pat. No. 5,029,145 teaches a method of geophysical exploration whereby shot points and receiver locations are positioned such that seismic data resulting therefrom can advantageously be processed employing 3-D processing techniques to obtain a better image of the earth's subsurface structure. According to the described technique, the vertical cable is used to improve the 3-D image of the earth's subsurface. No far-field signature measurement is sought in the described technique.

The signatures can be used to compute deconvolution operators to be applied on the seismic data. This procedure will improve the resolution of the final seismic image compared with the images obtained from conventional acquisitions, which do not have true signature available. Because of the 3D nature of the VC technique, signatures with different incident angles and azimuths (multidirectional) may be collected.

Therefore, the open literature is devoid of a method able to directly or indirectly measure the multidirectional far-field signatures from the seismic source array with exactly the same acquisition parameters and sea conditions in which the seismic data was acquired, such method being described and claimed in the present application.

SUMMARY OF THE INVENTION

According to the invention, there is provided a method of measuring the multidirectional true far-field signature of an array of air-guns taking advantage of the vertical cable technique.

Broadly, the inventive method for the measurement of the multidirectional far-field signature of a seismic source used for acquiring data with the aid of a set of vertical cables as illustrated in the accompanying Flowchart comprises:

a) providing a vertical cable technique for vertical cable seismic acquisition;

b) acquiring seismic data according to a give geometry with receivers equally distributed along each of a set of vertical cables in different levels, obtaining a data set volume which is made up of seismic traces generated for each shot point location at the surface c) from said data-set, specifying the receivers located below the far-field region of the utilized seismic source array and above the sea bottom such as any other seismic events do not arrive during the recording of the complete length of the seismic signature;

d) sorting the obtained data from b) into common selected-receiver gathers CSRG such as the seismic traces inside the CSRG are related to the shot points at the surface active for that specific receiver;

e) windowing the data along the direct wave of the data obtained in d), such as the length of the window has the same length as the length of the signature to be measured;

f) computing from the windowed direct wave the azimuth and incident angles related to the sea surface of each signature from the navigation position of the center of the seismic source at each shot point and from the positioning of each single receiver of each cable, so as each seismic trace in the CSRG will have azimuth and incident angle information;

g) normalizing the amplitude of each signature obtained in each CSRG from f) as if said signature was measured at a distance (geometric spreading correction) of one meter to the center of the source array by multiplying the signature amplitude values by the source-receiver distance; and h) obtaining the far-field multidirectional signature for each seismic source array location.

Thus the present invention provides a method for the measurement of the multidirectional far-field signatures from vertical cable seismic data.

The present invention provides further a method for the measurement of the multidirectional far-field signatures where the accuracy of the obtained signatures leads to improved resolution of the final seismic image.

The present invention provides still a method for the measurement of the multidirectional far-field signatures where the obtained signatures contain effects such as source ghost, instruments impulse response, receivers impulse response, ambient noise and sea conditions, such effects being the same as those affecting the seismic data.

The present invention provides still a method for the measurement of the multidirectional far-field signatures where the fact of having the same effects embedded inside the signatures increases the accuracy of the deterministic deconvolution operators.

Thus, the open literature describes several methods for the measurement of the far-field signature as well as various applications of the vertical cable technique, However, nowhere is it described or suggested to apply the vertical cable technique to the measurement of the far-field signature so as to improve the seismic resolution, such application being described and claimed in the present invention.

BRIEF DESCRIPTION OF THE DRAWINGS

The Flowchart.

DETAILED DESCRIPTION OF THE PREFERRED MODES

Throughout the present specification, it will be seen that the vertical cable approach may be considered as a technique of choice for acquiring true 3D marine seismic data. The 3D geologic structures to be investigated for oil exploration require a method like the vertical cable to properly form the image of the structured geologic target.

Figure 5:
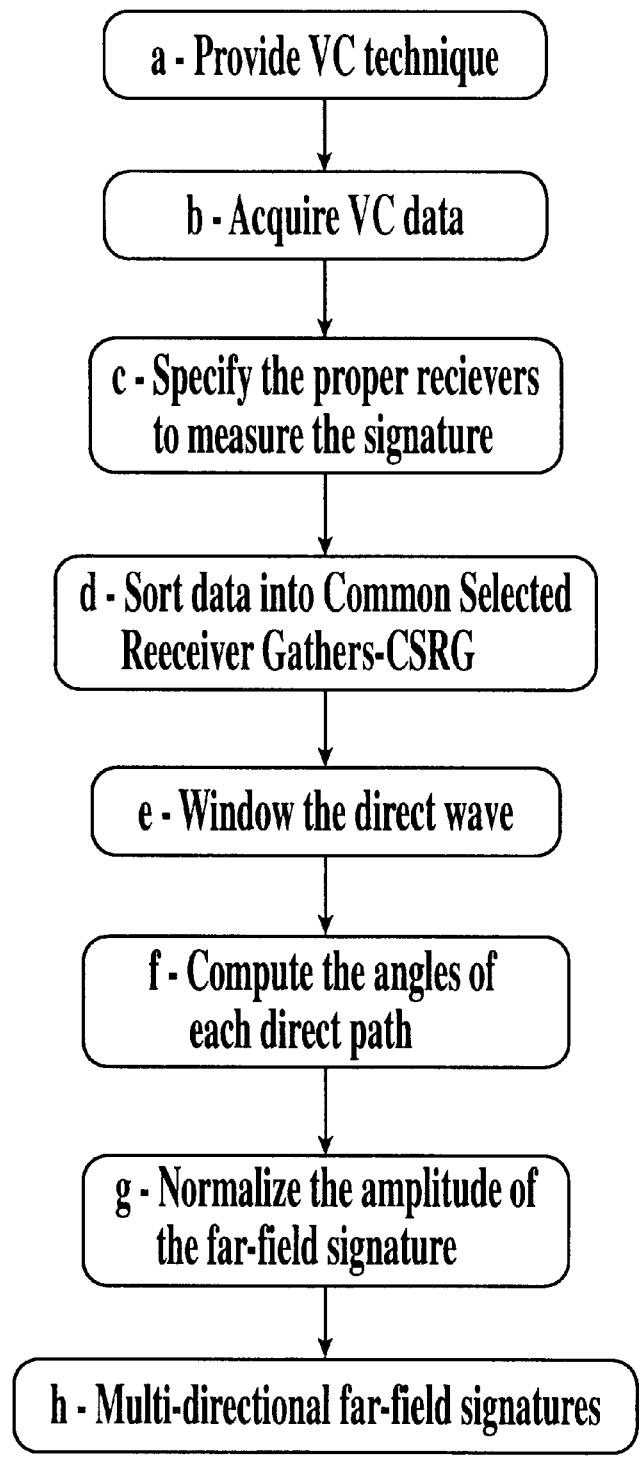
FIG. 5, is a schematic, step by step illustration of the method of the present invention.

The method of the invention will now be described by reference to the attached Flowchart, FIG 5, and Figures.

According to the Flowchart step a involves providing a vertical cable technique for vertical cable seismic acquisition.

And step b involves data acquisition using Vertical Cable (VC). See Gallotti Guimarães, M.A et al in "Processing of three dimensional vertical cable data over SEG/EAGE physical model", Abstracts of Offshore Technology Conference, 1998. VC maintains cables with equally spaced single receivers fixed at different depths over part of the area to be surveyed. The seismic source vessel shots over an area providing true 3D information of the subsurface. For each cable, shots from different directions are generated by the source array. The cables and the shooting area are then moved until the area to be surveyed is completely covered (FIG. 1 and FIG. 2A).

The vertical cable technique utilizes single receivers distributed vertically in different levels inside the sea water layer (FIG. 2A) instead of the array of receiver used in the streamer surveys. Receiver arrays are used to reduce the ambient noise but also cause the directivity effect. On the contrary, VC receivers are positioned inside the water layer in a quieter environment and, therefore, single receivers are able to observe the seismic data with a reasonable signal-to-noise (S/N) ratio. As a consequence, the observation of the seismic energy, in the VC technique, depends only on the directivity of the seismic source. Therefore, contrary to the arrays of the state-of-the-art technique which may utilize a set of receivers in each level, the present method requires that each receiver level be composed of only one element (or receiver), with the advantage that the directivity of the seismic source only will affect the signature.

Figure 1:
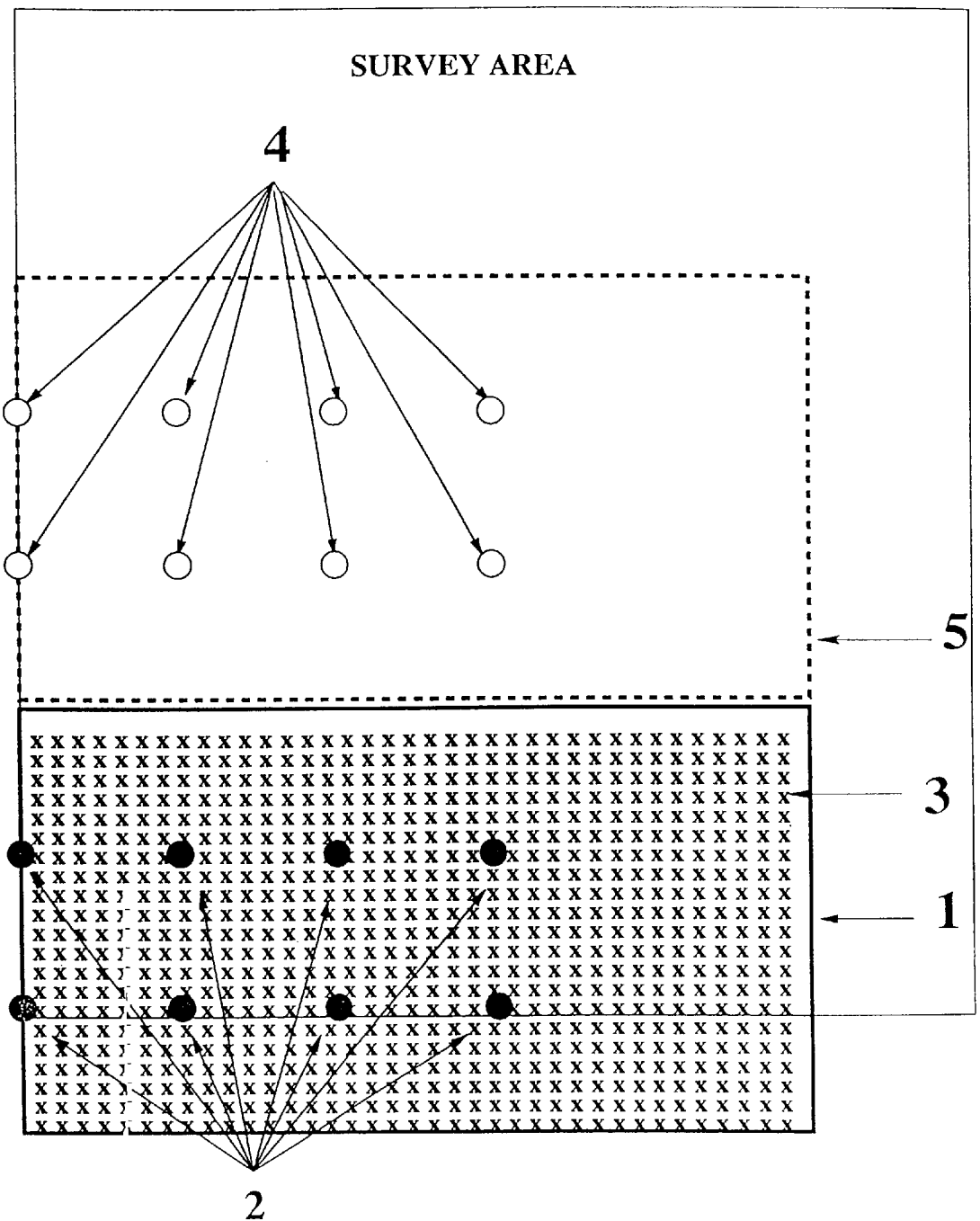
FIG. 1 an example diagram showing the procedure of a vertical cable acquisition with fixed cables and the shooting area according to the present invention.
Figure 2A:
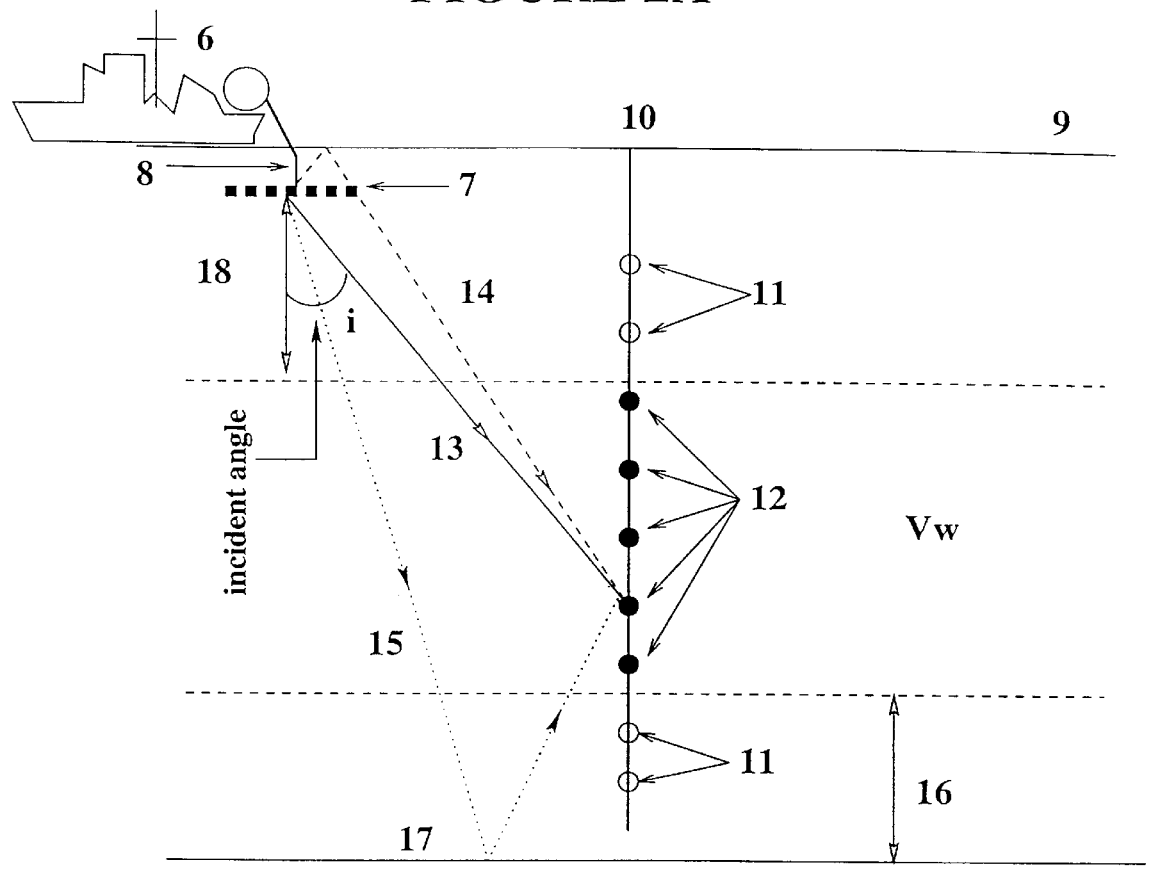
FIG. 2A and 2B is a diagram used to describe of a 2D view of a vertical cable with receivers, the good region to select receivers to obtain the multidirectional far-field signature. The air-gun array and the main ray paths of the seismic wave are shown as well.

FIG. 1 illustrates a non-limiting example of vertical cable geometry to uniformly sample the subsurface. According to said geometry, the cable position for the shot patch is indicated by numeral (1). Eight cables (2), represented by a circle, are activated for shot patch (1) represented by the rectangle drawn as a continuous line. The shot patch is made up of shot points (3) with all shots equally spaced inside the rectangle. After shooting the first patch, the eight cables (2) and shot patch (1) are moved on to the next position. The new position of the cables is now indicated by numeral (4) while the new position of the shot patch is indicated by numeral (5). This movement procedure of shot patch and fixed cables is repeated throughout the surveyed area in both x- and y-direction such that every point in the sub-surface is covered by seismic energy.

Adequately, the space between each shot in both x- and y-direction usually is 20 m or less. The 20-m or less shot point interval is preferred since it samples the subsurface in a better way than longer intervals and provides more signatures to be used.

It should be noted that no matter which kind of vertical cable acquisition geometry, like cable space, amount of shot patches, number of shot lines and even the large shot point interval in each patch to contemplate the required subsurface coverage, the signatures will be accurately measured according to the chosen geometry.

From this geometry it may be seen that vertical cable is deemed to be the best tool for acquiring true multidirectional seismic data, in opposition to the conventional 3D seismic surveys, which acquire a 3D volume by adding up 2D lines along the area to be investigated. Therefore VC may be considered as the technique of choice in acquisition methods to obtain true multidirectional signatures.

Step c of the method (see Flowchart) is related to FIG. 2A, which is a 2D view of VC data acquisition according to the invention. It shows a shooting vessel (6) hauling the seismic source array (7) at a certain depth (8) of the sea surface (9), one of the fixed cables (10) with the equispaced receivers (11) and (12), and the ray-path of the direct (13, 14) and reflected (15) seismic waves. Usually, the cables may have several receivers (11) and (12) distributed along the vertical cable.

Figure 2B:
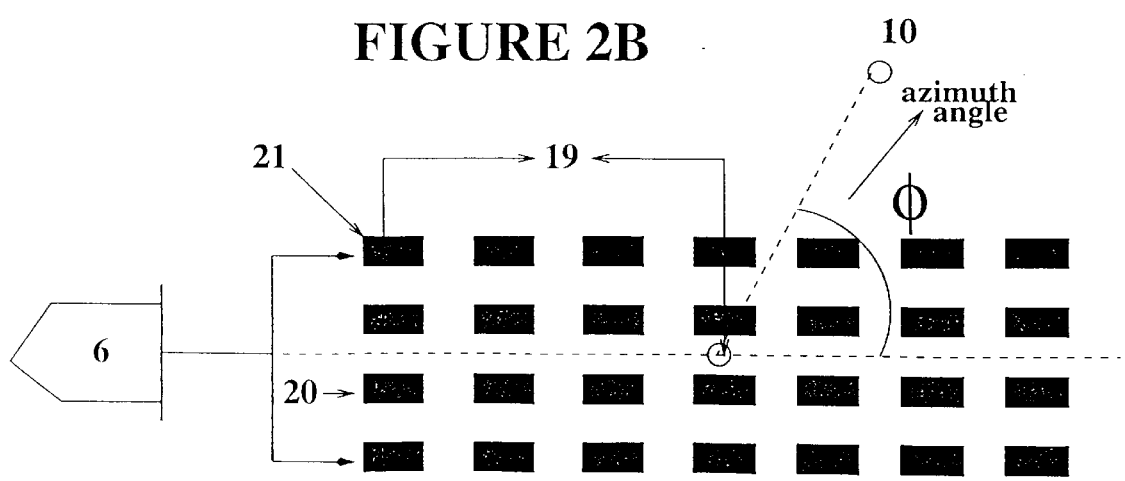

FIG. 2B is a zoom view of the seismic source array (7) showing a non-limiting example where source arrays (7) are made up of one or more strings (20) with one or more air-guns (21) forming a bi-dimensional array. Other configurations are possible as well.

The shooting vessel (6) is in charge of carrying the seismic source array (7) which usually has the same characteristic of the source used in the conventional streamer technique. Various air-guns (21) of different volumes are used to provide strength to the source and reduce the well-known bubble effect.

The arrays are constructed of one or more string (20) of air-guns (21) placed in-line (x-direction). Strings (20) are disposed cross-line (y-direction) forming the array, which is easily hauled by the shooting vessels. The air-guns are fired at pre-determined shot positions with a very short acceptable delay time.

Depending on the geologic targets, the source array (7) may be placed at different depths, changing the waveform of the source array signature. Thus, each source array configuration (such as illustrated in FIG. 2B) generates different multidirectional signatures. Again, no matter which kind of seismic source configuration used, the present method will allow the measurement of the signature.

During the acquisition, the positioning of each element air-gun (21) in the array may vary due to the sea conditions. The elements in the array may be represented by either single or cluster air-guns. Moreover, sometimes a few air-guns (21) of the source array (7) may fail. Besides, standard pressure and depth may vary, which does not necessarily imply that the line will stop. Thus, the characteristics of the source array (7) may vary from survey to survey and also from shot point (3) to shot point (3). In order to better comply with the method, signatures may be regularly measured to assure an accurate knowledge of the wave forms of the far-field signature for each shot point (3).

Interestingly, in the present method the measurement of the source array signatures will present the same characteristic as that of the waveform of the subsurface reflections, which is extracted from the seismic data.

The measurement of the multidirectional far-field signature is carried out by following the procedure depicted in FIG. 2A. At first, one should determine the depth inside the water layer in which the receiver is at the far-field of the source array (7) that is being utilized.

There are at least two main constraints on the determination of the correct far-field region: the distance (16) between the receivers (11) and (12) and the water bottom (17), and the distance (18) between the receivers (11) and (12) and the source array (7).

The water-bottom distance (16) must be such that the source signal is completely received before the arrival of the up-coming reflection observed in VC technique. This is driven by an equation cited in the above mentioned paper by Johnston et al, page 571 relating distance between the source array (7) and the water bottom (17) to the desired wavelet duration which requires that the speed of sound in water be known, especially around the position of the receivers (11) or (12).

In spite of the fact that the variation of the speed of sound in water is small, it can entail a wrong definition of the minimum water-bottom distance (16) from the receivers (11) or (12). According to the inventive method, the water velocity Vw may also be locally computed, so as to improve the accuracy of the speed of sound in water, certifying if the distance from the sea bottom is correct or not.

The far-field distance (18) (FIG. 2A) is determined when a primary pulse generated by the air-gun (21) which is farthest placed relative to the center of the source array (7) arrives at the receiver simultaneously with the primary pulse generated by the air-gun element which is the closest element to the center of the array. The distance between those two elements is shown by numeral (19) in FIG. 2B.

In digital recording systems, simultaneous arrival means that the primary pulse arrives in the same sampling interval. If the receiver is too close to the air-gun array (7), this requirement will not be satisfied and distortions may occur. The correct distance (18) is known as the far-field distance of the array (7). Each air-gun array (7) has its own far-field distance, which depends on its geometry in the x- and y-directions.

Thus, only a few receivers of the vertical cable will be able to correctly observe the multidirectional far-field signature. They must be beyond the far-field distance (18) from the source as well as at the proper depth to avoid the up-coming reflection waves (15).

FIG. 2A shows the main paths through which the seismic energy of each air-gun or cluster (21) travels. Marine explosive sources generate a bubble, which oscillates in the water and produces a compressive wave-field. Thus the seismic wave propagates in all directions. First, it reaches the receiver directly through path (13). Then the free-surface (9) reflected wave arrives at the receiver through path (14) with inverted polarity, this being known as the ghost effect of the source. Then the up-coming wave reflections, which are reflected from the entire interface below the water layer, arrive through path (15). The waves reflected from the deeper horizons bring information, which is called seismic reflections, and make part of the seismic data, which will generate the seismic image.

The waveform made up of direct energy and reflected energy is called primary pulse of the single air-gun or cluster signature. The bubble oscillating in the water generates pulses similar to the primary pulse within a certain time period. This time, usually known as bubble period, depends on the volume and characteristics of each cluster or single air-guns inside the array. The most important, since it contains the highest amplitude of the bubble pulses, is the first bubble pulse, which is called secondary pulse.

In the present invention, the directivity is expressed by two angles:

incident and azimuth angle. Incident angle is designed by the symbol i as in FIG. 2A while azimuth angle is designed by symbol Ø as in FIG. 2B. The incident angle is the angle between the path from the center of the source-receiver path and the vertical to the sea surface (9). The azimuth is the angle between the projection line of the source-receiver distance at the surface and the line along the streams (20) of the source array (FIG. 2B).

At the far-field region, the primary pulse and secondary pulses of each source element (21) of the array adds up in the same arrival time. They are delayed only according to their distance to the center of the array. The above mentioned superposition of each individual element of the array will form the far-field signature of the array. The above mentioned delays cause an effect in the signature called directivity. Thus, x and y position and the depth of the elements in the array cause the directivity.

The secondary pulses of each element of the array, however, will be also delayed by the differences of the bubble period. Therefore, a strong attenuation of the secondary pulse takes place, while the primary pulse is enhanced on the above-mentioned superposition. The remaining of the secondary pulse energy is called residual bubble pulse (24). Thus, the far-field signature is made up of the primary pulse (23) affected by the directivity and also by the residual bubble pulse (24) which is affected by the directivity as well but with a strong attenuation caused by the different bubble periods of each element signature of the source array.

Figure 3:
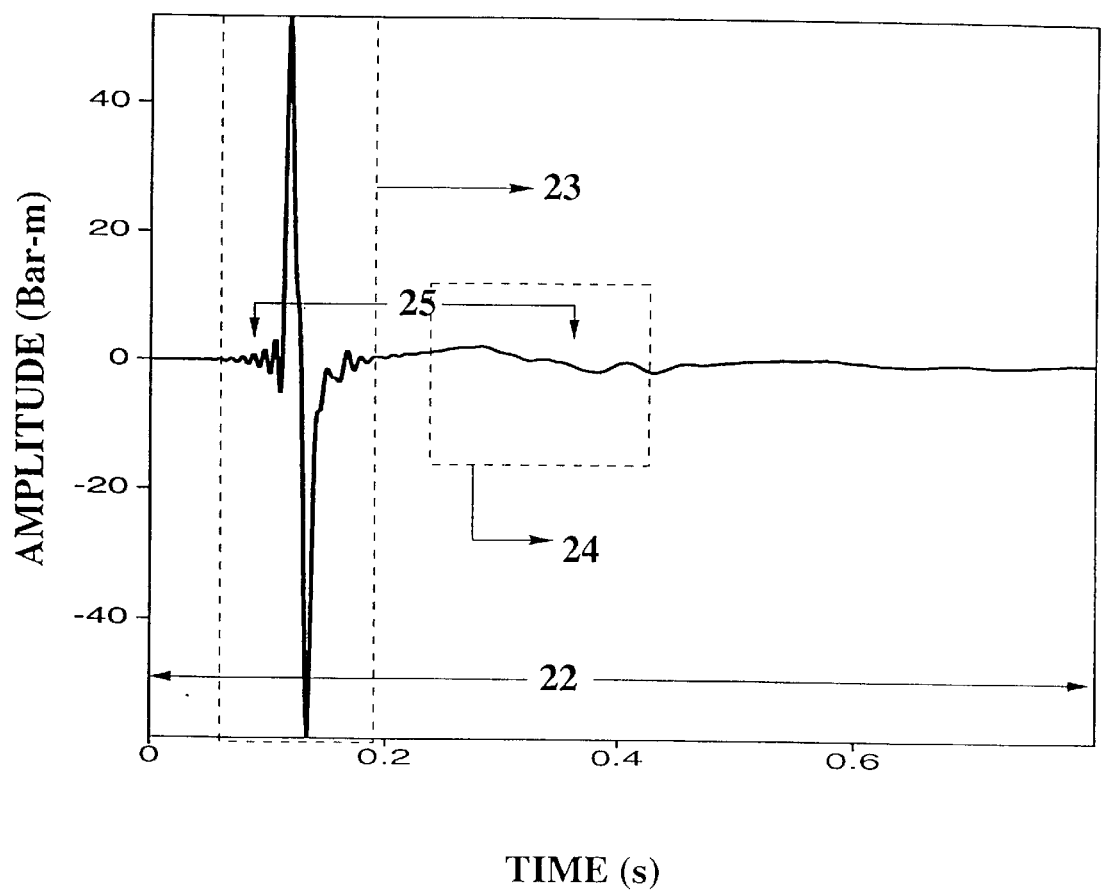
FIG. 3 depicts the far-field signature of a source close to the vertical cable position in both time and frequency domain.

The wavelet duration (22) may be at least twice the time length between the primary pulse (23) and the bubble pulse (24) (FIG. 3). Such time length is indicated by numeral (25) in FIG. 3.

In order to observe the far-field signature, the receivers should be somewhat apart from the sea floor to avoid interference with the reflections that come from the sea bottom and subsurface. The distance the receivers should be apart from the sea bottom is related to the wavelet duration (22) and the Vw (see FIG. 2A). Thus, only some receivers in the vertical cable are useful to obtain the true far-field signature of the seismic source. Those receivers are represented by numeral 12 in FIG. 2A. At this stage preliminary procedures for step c are ready and said step may be started.

Step d of the method involves selecting receivers (12) from the seismic data by sorting into 3D common selected receiver gathers CSRG's. The CSRG's are made up of traces generated by each shot point at the surface. The direct wave from the seismic source array to the specified receivers (12) represents the multidirectional signatures of the seismic source array of each shot point.

Therefore every trace carries the true direct signature which represents the far-field signature of the source, containing all the features that take place during the acquisition. If the air-gun array is out of specification, such as gun failures or wrong depth due to weather conditions, or any other problem with the seismic source system, the signature to be measured will carry the same characteristic drawbacks.

Common receiver gathers will be used to process the seismic image of the subsurface. Normally, the direct wave is removed to use only the reflections of the subsurface interface. In this method, the retrieval of the far-field signatures is made with the aid of the direct wave.

Step e may then be started. In order to separate the signatures from the reflection data, the direct wave is windowed with the required time length, which is at least twice the time length (22) between the primary and the secondary pulses.

Figure 4:
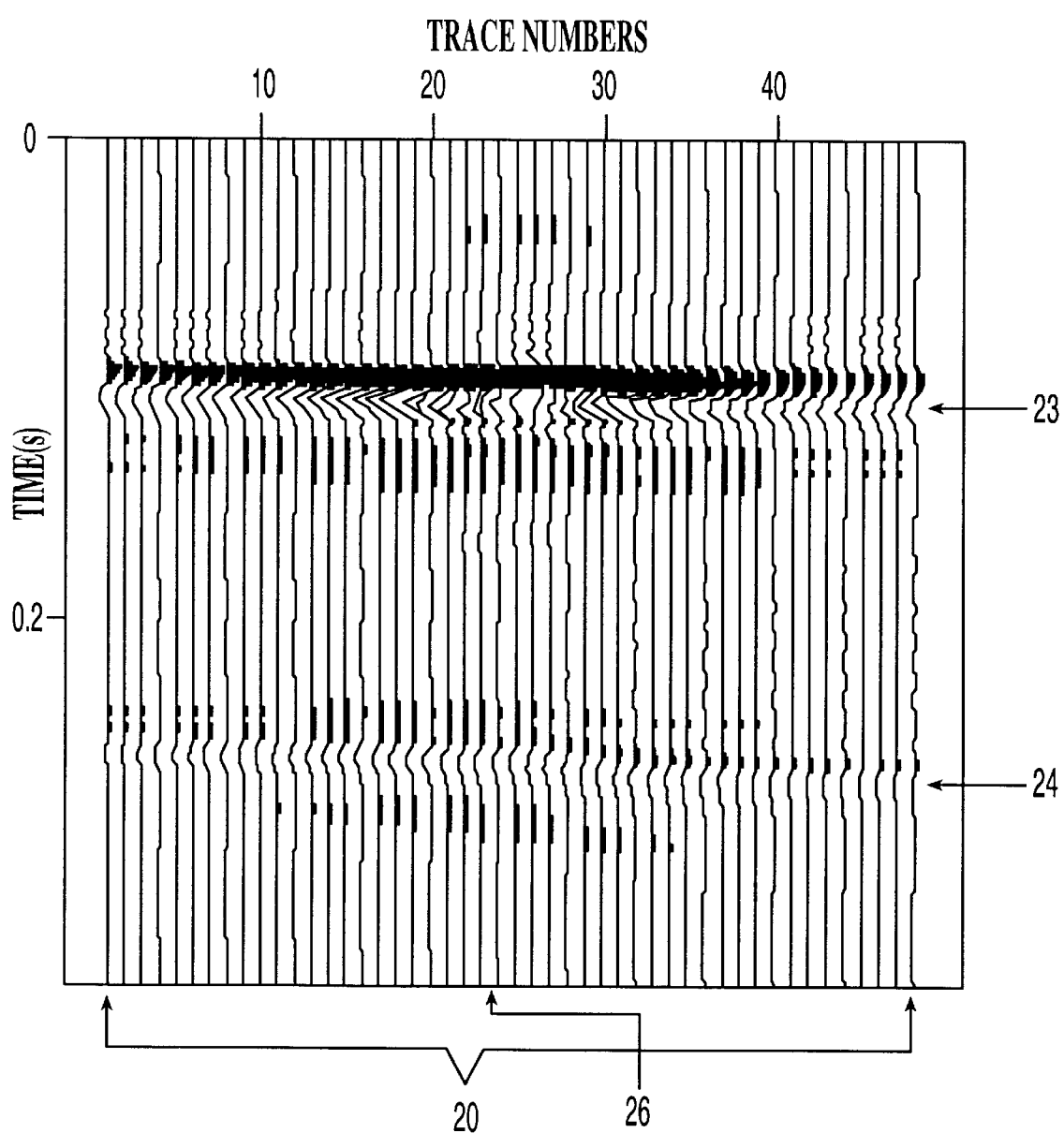
FIG. 4 illustrates the direct wave shifted to the same vertical time of different incident angles. The azimuth is fixed.

FIG. 4 illustrates a few traces (27) of the CSRG, which is as a matter of fact one direction of the 3D CSRG, i.e., one fixed azimuth. Therefore each trace in this gather contains signatures of different incident angles of the seismic source array. The traces are the representation of the windowed direct wave shifted in time in order that all the signatures arrive at the same time. It should be understood that the signatures or the traces (27) vary according to the incident angle.

Numeral (26) is the point where the source array is close to the vertical cable. Therefore the incident angle of the signature represented by this trace is close to zero degree and the travel path between the center of the seismic source and the receiver is minimum at this position (see FIG. 2A). Selecting another direction in the same CSRG allows one to observe the signatures with different incident angles in another fixed azimuth.

Therefore, it can be seen that each CSRG contains signatures in all directions, and Step e of the method may be started.

So, in Step f, each trace in the CSRG carries a signature with the azimuth and incident angle specified by its position and the position of the center of the source. As each trace is generated by each shot point, the computation of the azimuth and incident angles may be carried out through the navigation of the center of the source array and the vertical cable position.

Step g deals with normalizing the amplitude of all the obtained signatures as if they would arrive at the same position, that is, one meter apart from the center of the seismic source. This procedure is carried out by multiplying the signature by the distance between the receiver and the center of the seismic source.

As a result, according to Step h, the normalized multidirectional far-field signatures of the seismic source for each shot point in the survey are obtained.

The knowledge of the far-field signatures of the array for all directions is the main source of data for the signature deconvolution process.

One of the most important methods in data processing is the spike deconvolution. Several effects are supposed to be removed from the data to provide the geologic interface reflections with a higher resolution representation. Among those effects are the source signature and other effects caused by the acquisition parameters.

The air-gun array signature is close to minimum-phase as a function of continuous time. The phase spectrum is different, however, from the minimum-phase spectrum, which is required by spiking deconvolution for a sampled and time-windowed version of the signature. As a consequence, there can be large phase errors when spiking deconvolution is applied to an air-gun signature or to a recording instrument response. Therefore, signature deterministic deconvolution is normally applied on the data to correct this phase distortion before applying spike deconvolution. Signatures should be provided to design the deterministic deconvolution operators.

The source signatures may be used for various applications in the seismic exploration. During the acquisition, information of the far-field source signatures can provide valuable information about the source array behavior. The repeatability of the seismic source is one of the most important issues. The source signature should not vary so much from shot to shot. Even by measuring signatures for all the shots, designing operators for each shot location would demand a hard job. Thus, the source should be stable enough during the survey to behave as a repeatable source. This means that the amplitude spectrum of the far-field signature can not vary too much in the seismic bandwidth.

The seismic source signature in real time is used for computing the amplitude spectra. Thus, the geophysicist on board can follow up the source array behavior during the acquisition operation by analysis of the far-field signatures in the frequency domain. In case of air-gun failures, the amplitude spectra of the multidirectional signatures will vary. According to this variation, he or she may or may not request the interruption of the acquired line to fix the air-gun in the array. This capability of making decision may avoid unnecessary interruptions during the survey avoiding downtime and consequently reducing the cost of the survey.

It happens in vertical cable technique that the data are not available on the seismic shooting boat. However, processing and analyses of the previous swathes, surveys or even a scouting shooting program over one of the cables to be used in the survey, can help to design an air-gun dropout scheme to be applied.

In the same fashion, air-guns might be placed in the array to replace failed air-guns to help in the design of a more sophisticated scheme.

In accordance with the invention:

The vertical cable 3D seismic technique should be used to acquire seismic data instead of the conventional streamer technique.

From this measurements the true far-field signature of the source array is derived in any direction.

The impulse instrument response, the receiver response, the source free surface ghost response, and the ambient noise, and all other effects that might happen during the survey will be embedded in the signature providing to the final measured signature one of the most reliable multidirectional far-field signatures known in the Industry.

No further equipment besides those commonly used in the technique is required to measure the far-field signatures.

True 3D operators can be designed to deconvolve the signature from the data, providing to the VC technique the capacity of an optimum signature deconvolution and therefore improving the vertical resolution of the method as compared to the conventional streamer method.

The present method of obtaining the multidirectional signatures will provide information that are useful for the following areas in the seismic exploration: quality control of the seismic source during the acquisition, positioning of the cables in VC technique, true directivity effect of the source arrays, and true signature deconvolution. Consequently, the seismic method acquired with VC technique will be more effective for the following areas: seismic data acquisition, vertical seismic resolution, 3D seismic amplitude studies, analysis of amplitude vs. offset (AVO), and seismic inversion.

Seismic data will be more reliable to be interpreted for oil exploration and reservoir characterization and monitoring (time-lapse 4D surveys).

Therefore, the Vertical Cable technique may be successfully used in acquiring the 3D seismic data instead of the conventional streamer technique.

What is claimed is:

1. A method for the measurement of the multidirectional far-field source array signatures from marine seismic surveys which comprises the steps of:
   a) providing a vertical cable technique for vertical cable seismic acquisition;
   b) acquiring seismic data according to a given geometry of vertical cable with receivers equally distributed along each of a set of vertical cables in different levels, obtaining a data set volume which is made up of seismic traces generated for each shot point location at the surface;
   c) from said data-set, specifying the receivers located below the far-field region of the utilized seismic source array and above the sea bottom such as any other seismic events do not arrive during the recording of the complete length of the seismic signature;
   d) sorting the data from c) into common selected-receiver gathers CSRG, such as the seismic traces inside the CSRG are related to the shot points at the surface active for that specific receiver;
   e) windowing the data along the direct wave of the data obtained in d), such as the length of the window has the same length as the length of the signature to be measured;
   f) computing from the windowed direct wave the azimuth and incident angles related to the sea surface of each signature from the navigation position of the center of the seismic source at each shot point and from the positioning of each single receiver of each cable, so as each seismic trace in the CSRG will have azimuth and incident angle information;
   g) normalizing the amplitude of each signature obtained in each CSRG from f) as if said signature was measured at a distance (geometric spreading correction) of one meter to the center of the source array by multiplying the signature amplitude values by the source-receiver distance; and
   h) obtaining the far-field multidirectional signature for each seismic source array location.

2. A method according to claim 1, wherein the seismic source signature in real time is used for computing the amplitude spectra.

3. A method according to claim 1, wherein the geometry of the vertical cable acquisition may vary to comply with the objectives of the seismic survey.

4. A method according to claim 3, wherein the geometry of the vertical cable comprises shot patches each comprising shot lines with shot points with distance between shot lines and shot points to comply with the objectives of the seismic survey.

5. A method according to claim 3, wherein the distance between cables and the distance between receivers in each cable should comply with the objectives of the survey.

6. A method according to claim 3, wherein the movement of the shot patch and of the fixed cables for each shot patch to cover the survey area should comply with the objectives of the survey.

7. A method according to claim 3, wherein the number of cables and the number of receivers should comply with the objectives of the survey.

8. A method according to claim 3, wherein the seismic source array with number of air-guns, position of the air-guns, volume of the air-guns, firing synchronization of the air-guns, pressures in the air-guns, type of the air-guns, configurations of the air-guns in the array, depth of the air-guns in the water, design of the arrays and position of the air-gun according to the seismic vessel should comply with the objectives of the survey.

9. A method according to claim 3, wherein the recording instrument sample rates and filters should comply with the objectives of the survey.

10. A method according to claim 3, wherein the navigation systems should comply with the objectives of the survey.

11. A method according to claim 4, wherein the objectives of the survey comprise obtaining properly recorded reflection data in order to image the geological targets for oil exploration.

12. A method according to claim 1, wherein the receivers to be selected in the vertical cable are those which are in the far-field of the seismic source array and apart from the sea bottom at a sufficient distance to avoid interference with the seismic reflections.

13. A method according to claim 12, wherein said sufficient distance is related to at least twice the time between the primary pulse and secondary pulse of one far-field signature and propagation velocity of the seismic wave in water.

14. A method according to claim 12, wherein the said receivers are selected into common selected receiver gathers CSRG.

15. A method according to claim 14, wherein each trace in the CSRG is windowed with a time length which corresponds to a time that is at least twice the time between the primary pulse and secondary pulse of a far-field signature.

16. A method according to claim 1, wherein the azimuth and incident angles of the far-field signature are computed from the navigation of the seismic source and the position of the seismic cable.

17. A method according to claim 1, wherein the amplitude of each signature is normalized so that all the signatures may be measured at one meter apart from the center of the source array.

18. A method according to claim 1, wherein the obtained multidirectional far-field signatures of the seismic source array have the same characteristics as those that generated the seismic reflections.

* * * * *